United States Patent [19]
Lee et al.

[11] Patent Number: 5,594,927
[45] Date of Patent: Jan. 14, 1997

[54] APPARATUS AND METHOD FOR ALIGNING DATA TRANSFERRED VIA DMA USING A BARREL SHIFTER AND A BUFFER COMPRISING OF BYTE-WIDE, INDIVIDUALLY ADDRESSABE FIFO CIRCUITS

[75] Inventors: Ching S. Lee, Ashland; Frank A. Itkowsky, Jr., Leominster, both of Mass.

[73] Assignee: Digital Equipment Corporation, Maynard, Mass.

[21] Appl. No.: 306,855

[22] Filed: Sep. 15, 1994

Related U.S. Application Data

[63] Continuation of Ser. No. 818,594, Jan. 9, 1992, abandoned.

[51] Int. Cl.$^6$ .............. G06F 13/00; G06F 13/38
[52] U.S. Cl. .......... 395/886; 395/842; 364/DIG. 1; 364/238.6; 364/238.7; 364/239; 364/DIG. 2; 364/961.1; 364/965.7
[58] Field of Search .................. 395/311, 886, 395/842

[56] References Cited

U.S. PATENT DOCUMENTS

| | | | |
|---|---|---|---|
| 4,338,675 | 7/1982 | Palmer et al. | 364/748 |
| 4,412,285 | 10/1983 | Neches et al. | 395/650 |
| 4,669,043 | 5/1987 | Kaplinsky | 395/400 |
| 4,751,671 | 6/1988 | Babetski et al. | 395/250 |
| 4,814,979 | 3/1989 | Neches | 395/650 |
| 4,827,441 | 5/1989 | Someshwar et al. | 364/715.08 |
| 4,831,518 | 5/1989 | Yu et al. | 395/650 |
| 4,835,674 | 5/1989 | Collins et al. | 395/200.02 |
| 4,979,100 | 12/1990 | Makris et al. | 395/325 |
| 5,020,023 | 5/1991 | Smith | 395/250 |
| 5,043,935 | 8/1991 | Taniai et al. | 395/275 |
| 5,392,406 | 2/1995 | Petersen et al. | 395/311 |

*Primary Examiner*—Thomas C. Lee
*Assistant Examiner*—D. Dinh
*Attorney, Agent, or Firm*—Joanne N. Pappas; Denis G. Maloney; Arthur W. Fisher

[57] ABSTRACT

An apparatus and method for transferring data via DMA in data processing system from a host system to a transmission network. The transferred data is in longword format in which each longword consists of four bytes. Within a longword, valid bytes intended for transmission are contiguous. The adapter or I/O device includes a packet memory and a FIFO circuit interposed between the host system and packet memory to allow for differences in access speed of a host memory and the packet memory. The FIFO circuit contains four discrete FIFO circuits that are separately addressable for writing the bytes of each longword received from the host memory for storage in the FIFO circuit. The received longword is applied to a barrel shifter which aligns the first valid byte in the received longword with the one of the four discrete FIFO circuits containing a first available storage location at a current FIFO longword address. A FIFO control circuit receives information describing the number of valid bytes in the received longword and generates a control signal to control the barrel shifter and FIFO address signals to cause the valid bytes of the received longword to be stored in contiguous byte positions in the FIFO circuit commencing with the first available storage location.

23 Claims, 4 Drawing Sheets

APPARATUS AND METHOD FOR ALIGNING DATA TRANSFERRED VIA DMA USING A BARREL SHIFTER AND A BUFFER COMPRISING OF BYTE-WIDE, INDIVIDUALLY ADDRESSABE FIFO CIRCUITS

This application is a continuation of application Ser. No. 07/818,594, filed Jan. 9, 1992, now abandoned.

FIELD OF THE INVENTION

The invention relates in general to a communication adapter or input/output controller device for transferring data via DMA between a host system coupled to a system bus and a network or peripheral device and, more particularly, to a data storage circuit and method for storing data in the communication adapter or input/output controller device.

BACKGROUND OF THE INVENTION

Commonly assigned, copending U.S. patent application Ser. No. 07/818,566, now abandoned of Chmielecki, Jr. et al. entitled "Apparatus and Method for Transferring Data To and From Host System", is incorporated in its entirety herein by reference.

In a data processing system, communication adapters and I/O controllers are provided to transfer data between a host system and a network or peripheral device. A memory and processor of the host system are coupled to the adapter or controller by a system bus.

As the central processing units in host systems have become faster, the difference between the speed of processor operations involving local registers or cache memory and the speed of accesses between the processor of the host system and main memory or peripheral devices has been magnified. As a result, in order for data processing systems to better utilize the faster processors, there is a need to provide more efficient methods of transferring data between the host system and networks or peripheral devices.

In order to improve performance, most high performance adapters and controllers make use of direct memory access (DMA) to transfer data. However, the use of DMA itself does not guarantee high performance. A high performance adapter or controller should minimize the amount of time a system bus is used during transfer of data between the adapter or controller and the host system, should reduce the amount of work that must be performed by the host system, and also should provide an efficient implementation of DMA.

One model for DMA transfers between host memory and I/O controllers is described by H. Michael Wenzel for the IEEE P1212 CSR Architecture Specification in "CSR Architecture (DMA Framework): Recommended DMA Architectures," Part III-A, Draft 1.38 (Jul. 5, 1990), which is herein incorporated by reference.

In this model, which may be used for transfers involving such system buses as Futurebus+, SCI, and SerialBus, circular queues are provided for communicating information between the adapter and the processor in the host system. A circular queue is a software array structure of message storage locations. The items in circular queues are accessed in first-in, first-out order, and a particular circular queue will be used to pass messages in only one direction, from a single producer of the queue item to a specific consumer of the queue item.

Each circular queue is associated with two separate indices, i.e., a producer index and a consumer index. The producer index points to a selected item in the circular queue that has been or will be written ("produced"). The consumer index points to a selected item in the circular queue that has been or will be read ("consumed"). As items are added to and subsequently removed from the queue, the consumer index will continually chase the producer index around the circular array of items.

A circular queue may be used as a bus interface between a host memory in a host system and a communication adapter or I/O controller. Preferably, the entire circular queue is located in physically contiguous storage locations in the host memory. The communication adapter or I/O controller is provided with a set of control fields in its memory. The control fields describe the location of the circular queues located in host memory, and the value of the producer index and/or the consumer index.

A feature of the circular queue model is the ability to obtain access to and transfer items in blocks. For example, if the consumer is a communication adapter or I/O controller that falls far behind a processor that functions as the producer, a comparison of the producer and consumer indices will indicate how many queue items to transfer to memory in the communication adapter or I/O controller in one block read. Simply by reading the producer and consumer indices and comparing them, the producer determines how many empty locations are currently available in the queue, and the consumer determines how many full locations have not yet been read.

With respect to transmit operations in which data is read from the host memory for transmission on the network, the host memory data is transferred, under control of the host processor or by DMA, to a packet memory associated with the adapter. In order to facilitate the efficient transmission of the data, the data transferred from the host memory is stored in the packet memory in a predetermined format suitable for the particular type of network. For example, the data may be stored in the packet memory in longword format for subsequent formation of packets and transmission onto the network. As used herein, a longword format is one consisting of a predetermined number of bytes, e.g., four bytes. The predetermined number is not less than two.

In prior art systems, the adapter includes a first-in-first-out memory (FIFO) coupled between the host memory and packet memory to allow for differences in speed of access to the host and packet memory, and to allow for latency corresponding to delays in gaining access to the host or packet memories. Therefore, the host processor, or a DMA engine that drives the transfer of data from the host memory to the packet memory, first stores longwords of data from the host memory in the FIFO, and then transfers the stored longword data from the FIFO to the packet memory.

There are several constraints on the transfer from the host memory to the FIFO that result in added circuit complexity and reduction of transfer speed in prior systems. First, while data in the host memory is typically byte addressable, the data is only retrievable in longword format. That is, although a byte address can be applied to the host memory, a read operation will only cause retrieval of the longword containing the addressed byte. Second, it is likely the bytes of data stored in the host memory and identified by the host system for transmission are not stored contiguously in the host memory. As a result of these constraints on the accessibility of bytes identified for transmission, the four bytes of a longword actually retrieved from the host memory may not all be valid, i.e., not all be intended for transmission.

It is noted, however, that in accordance with known practices in the art, valid bytes are contiguous in the retrieved longword, i.e., stored at successive memory locations, so that the retrieved longword contains one to four valid contiguous bytes. The location of the valid bytes within the longword are identified by bits appended to the host memory address information provided by the host system.

It is therefore necessary to align the valid bytes of data contained in the longwords retrieved from the host, in order to form longwords containing valid bytes for storage in the longword addressable FIFO. FIG. 1 illustrates a block diagram of a conventional circuit 100 for aligning and storing longwords composed entirely of valid bytes in a longword addressable FIFO 102. Circuit 100 includes a seven-byte shifter 104 coupled to receive a four-byte longword retrieved from the host memory, and to provide a seven-byte wide output in which the received four bytes have been shifted to a desired position. The shifting of data by shifter 104 is performed in accordance with a control signal received from a control circuit 106.

The shifted four bytes of the retrieved longword are stored in a seven byte wide holding register 108. A selector circuit 110 is connected to the seven byte positions of register 108, provides to FIFO 102 four valid contiguous bytes forming a longword from the data stored in register 108. A state machine 112 is connected to control the shifter 104 through control circuit 106, register 108, and selector 110. State machine 112 also controls the storage of longwords into FIFO 102 and the value of write pointer 114 which addresses the next longword location in FIFO 102.

State machine 112 in turn receives relevant control information for controlling the transfer of longword data from the host memory to the packet memory either directly from the host system or from a DMA engine. Control circuit 106 also receives address information from the host system identifying the location of valid bytes in the longword currently retrieved from the host memory. Based on the received address and control information, state machine 112 controls control circuit 106 and register 108 so that the valid contiguous bytes in each longword received from the host memory are aligned and stored in the next available positions in register 108. While invalid bytes included in a longword retrieved from the host memory may also be stored, they are overwritten in register 108 during subsequent storage operations. In this manner, state machine 112 controls the alignment and storage in register 108 of valid bytes successively retrieved from the host memory until register 108 holds at least four valid contiguous bytes, thereby forming a longword composed entirely of valid bytes.

Although a "valid" longword contains four valid bytes, it is necessary to provide register 108 with a width of seven bytes to accommodate the situation in which, after having accumulated three valid contiguous bytes in register 108, the next retrieved longword is entirely valid, i.e., it contains four valid bytes, thereby necessitating the simultaneous storage of seven valid bytes in register 108.

When register 108 holds at least four valid contiguous bytes, state machine 112 controls selector 110 to apply to FIFO 102 the first four valid bytes stored in register 108, which constitute a valid longword. The applied longword is stored in the next available longword position in FIFO 102.

Conventional circuit 100 illustrated in FIG. 1 is disadvantageous in that it requires provision of an additional storage element, i.e., register 108, to enable interim storage of bytes until a valid four-byte longword is formed. Circuit 100 is also disadvantageous in that register 108 must be provided with a width in excess of the actual longword size, and there is an increase in circuit complexity associated with controlling a register having an excess width. There is a further increase in complexity resulting from circuit 100 containing two interfaces with state machine 112, a first interface between state machine 112 and elements 102–110 and a second interface between the host system and the state machine. Furthermore, the inclusion of the additional register 108 between FIFO 102 and shifter 104 to form a valid longword, adds one or more clock cycles of delay in the data path.

While the above described conventional technique for storing valid longwords in the FIFO is implemented using hardware, another conventional technique is instead implemented in host software. In accordance with that technique, the host software causes the host to perform the additional steps of allocating dedicated valid longword buffers in host memory and copying valid bytes into those buffers to form valid longwords. These buffered valid longwords are then transferred to the FIFO. Disadvantageously, the additional storage steps performed by the host delay host operations.

SUMMARY OF THE INVENTION

It is an object of the invention to overcome at least some of the problems associated with the prior art.

It is therefore desirable to provide an improved communication adapter or input/output controller device which includes a packet memory and a data storage circuit that facilitates the efficient transfer of valid bytes of data from the host memory to the packet memory.

Preferably, the communication adapter should include a data storage circuit which is able to form and store valid longwords from longwords received from the host memory, with a minimum of circuit complexity and without unnecessarily delaying the transfer of data from the host system.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, there is provided a data storage circuit in a data processing system, wherein the data processing system includes a host system having a system bus coupled to a host memory, and an interface circuit coupled to the system bus for transferring valid bytes of data from the host memory to a peripheral device. The valid bytes of data are included in longwords stored in the host memory, the longwords in host memory each consisting of N bytes that are retrieved in longword format, where N is a predetermined integer greater than or equal to one. The data storage circuit is included in the interface circuit. The data storage circuit comprises shifter means, coupled to receive a data longword retrieved from the host memory and responsive to a shift control signal, for shifting the position of the N bytes of the received longword in accordance with the shift control signal and for providing on a shifter means data output the shifted longword. The data storage circuit also comprises memory means, coupled to receive the N shifted bytes provided by the shifter means, and an address signal, for storing the N shifted bytes in a sequence of contiguous available memory locations identified by the address signal, the sequence of contiguous available locations commencing with a first available byte location in which a next valid byte is to be stored. The data storage circuit further comprises control means, operatively coupled to receive information from the host system describing the location of valid bytes in the longword retrieved from host memory, for generating the shift control signal to control the shifter means to provide the shifted longword such that the first valid byte of the retrieved longword is aligned with a first available byte location in the memory means, and for generating the address signal.

Further in accordance with the invention there is provided a method for storing data in a data processing system including a host system having a system bus coupled to a host memory, and an interface circuit coupled to the system bus for transferring valid bytes of data from the host memory to a peripheral device. The valid bytes of data are included in longwords stored in the host memory, the longwords in host memory each consisting of N bytes that are retrieved in longword format, N being a predetermined integer greater than or equal to one. In accordance with the method, data is stored in a buffer memory in the interface circuit, wherein the buffer memory has a first available byte storage location in which the next byte is to be stored. The method comprises the steps of receiving a data longword retrieved from the host memory, generating a shift control signal to realign the position of the N bytes in the received longword, and shifting the position of the N bytes of the received longword in accordance with the shift control signal to align the first valid byte of the retrieved longword with the first available byte location in the buffer memory and to provide a shifted longword. The method also comprises the steps of providing a write address indicating a longword location in the buffer memory that contains the first available byte location, and storing, in the buffer memory, the N bytes of the shifted longword in a sequence of contiguous available memory locations starting at the first available byte location.

The accompanying drawings, which are incorporated in and constitute a part of this specification, illustrate preferred embodiments of the invention and, together with the description of the invention, explain the principles of the invention.

DESCRIPTION OF THE PREFERRED EMBODIMENT

Reference will now be made in detail to a preferred embodiment of the invention, an example of which is illustrated in the accompanying drawings.

Figure 1:
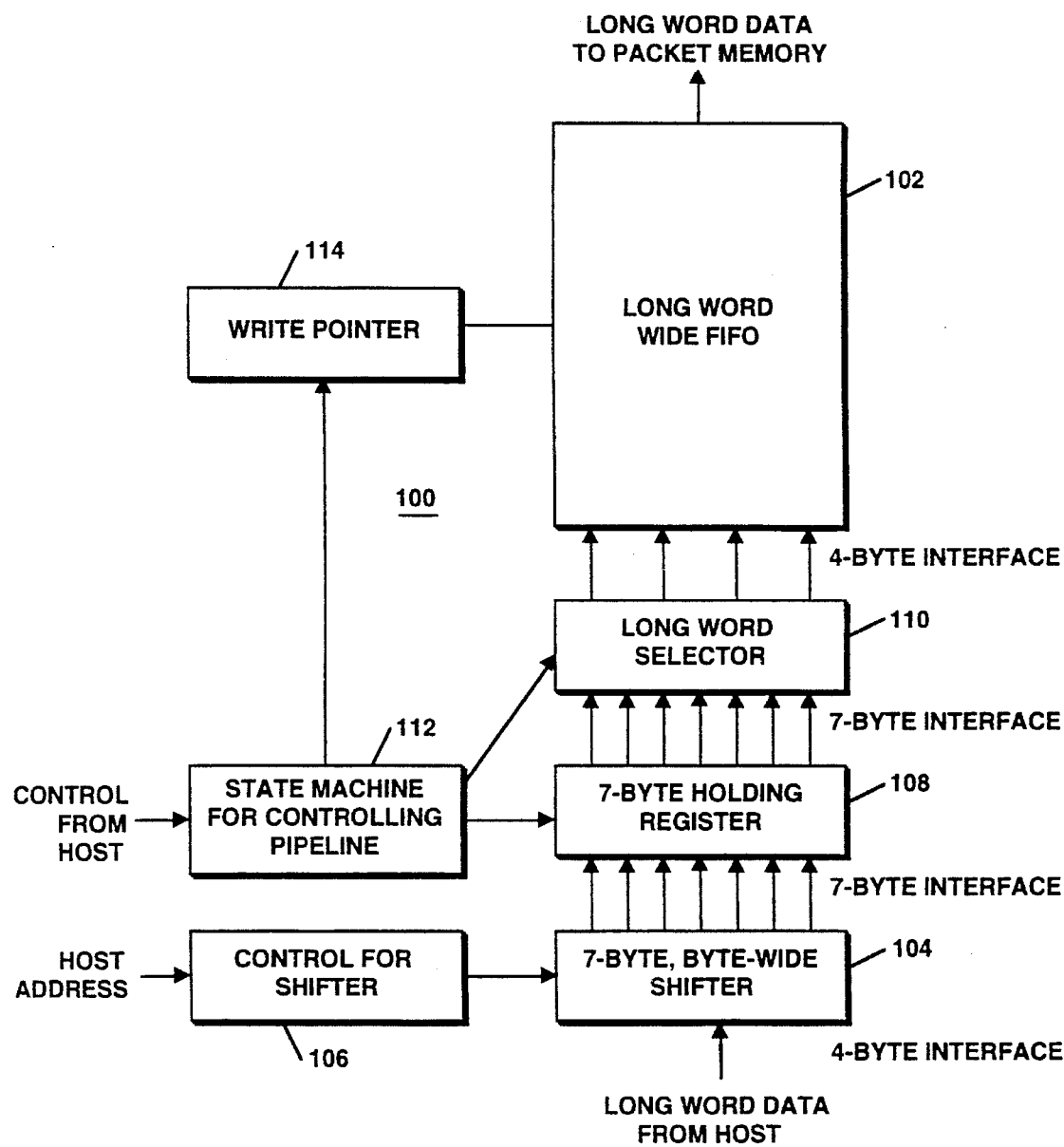
FIG. 1 is a block diagram of a conventional circuit for storing longwords in a FIFO.
Figure 2:
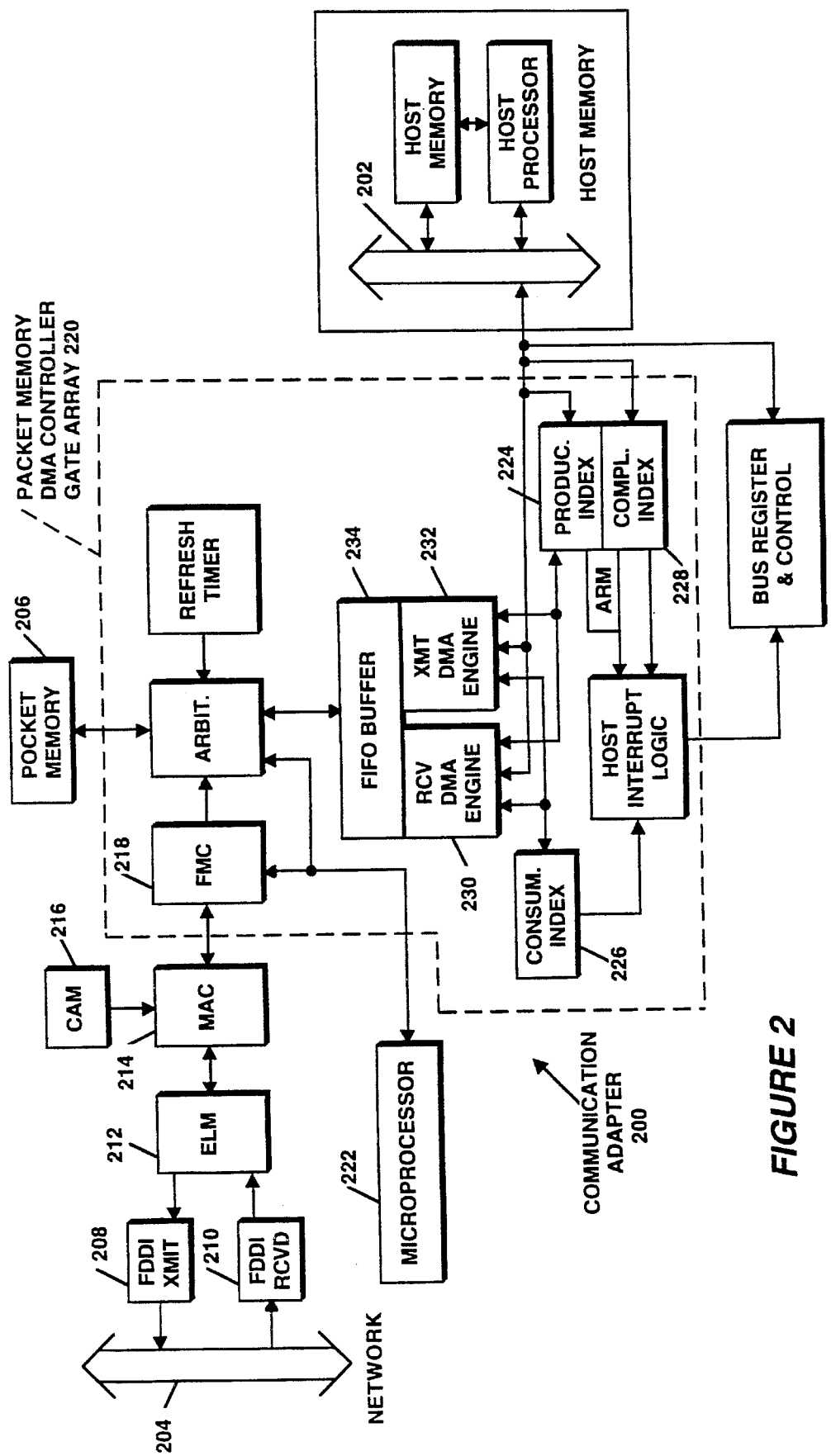
FIG. 2 is a block diagram of a data processing system in which the present invention can be practiced.

An embodiment of a device for transferring data in a data processing system is shown in FIG. 2. As embodied herein, the device is a communication adapter 200. The data processing system includes a system bus 202 coupled to the device. Preferably, system bus 202 transfers data in accordance with the bus specifications for Futurebus+. A host system includes a system bus 202 and a host memory.

The data processing system may include a network 204 coupled to the device. Various types of wide and local area networks may be coupled to communication adapter 200, including any packet data network. Examples include a token ring network or an Ethernet network.

A network of particular applicability is the fiber distributed data interface (FDDI), which is a proposed American National Standard for a 100 megabit per second token ring using an optical fiber medium. The characteristics of FDDI networks are described in detail by Floyd E. Ross in "FDDI-A Tutorial," *IEEE Communications Magazine*, vol. 24, no. 5, pp. 10–17 (May 1986), which is herein incorporated by reference.

Information is transmitted on an FDDI ring network in frames using a four of five group code, with each five-bit code group being called a symbol. Each byte corresponds to two symbols or ten bits. The nature of the clocking limits data frames to a maximum length of 4,500 bytes (i.e., 9,000 symbols or 45,000 bits).

Adapter 200 includes a packet memory 206 which is provided for storing data. Preferably, one megabyte of storage is supplied by packet memory 206, which includes nine 256 Kbit X 4 bit fast page mode DRAM chips that provide byte parity. Four Kbytes of storage in packet memory 206 is set aside for a circular queue in which the queue items are transmit data descriptors, 8 Kbytes of storage in packet memory 206 is set aside for a circular queue in which the queue items are receive data descriptors, 256 Kbytes of storage in packet memory 206 is set aside for transmit data buffers for storing transmit data, and 512 Kbytes of storage in packet memory 206 is set aside for receive data buffers for storing receive data.

In the case where network 204 is provided as an FDDI network, communication with the FDDI network is provided by FDDI optics and connectors in FDDI transmitter 208 and FDDI receiver 210, by elasticity buffer and physical link management (ELM) 212, and by a media access control gate array (MAC) 214. A content addressable memory (CAM) 216 operates with MAC 214, and stores valid network addresses.

A frame memory controller (FMC) 218 interfaces to MAC 214. Frame memory controller 218 is included in a packet memory DMA controller gate array 220. Frame memory controller 218 will place a packet of receive data from network 204 into a receive data queue in packet memory 206. Similarly, a packet of transmit data in a transmit data queue in packet memory 206 will be transmitted by frame memory controller 218 to MAC 214.

At times when frame memory controller 218 places a packet of receive data into a receive data queue in packet memory 206, a packet memory receive data descriptor identifying a packet memory receive data buffer is stored in the packet memory by frame memory controller 218. In a preferred implementation, the packet memory receive data descriptor is received from MAC 214 by frame memory controller 218, and includes a field indicating the starting address of the corresponding receive data buffer in packet memory. The packet memory receive data descriptor also may have a field specifying the number of receive data buffers corresponding to the packet, although as embodied herein, a single packet memory receive data buffer is provided for storage of each packet of receive data. The packet memory receive data descriptor also includes other fields indicating the length in bytes of the corresponding receive data buffer in packet memory, or the length in bytes of the packet of receive data (at times when a single packet memory receive data buffer is provided for storage of a packet of receive data). Other fields may provide frame status bits, a frame status count, and a receive completion code indicating whether the frame was successfully received and providing additional information about reception of the packet.

At times when frame memory controller 218 transmits a packet of transmit data from packet memory 206 to MAC 214, a packet memory transmit data descriptor identifying a packet memory transmit data buffer is utilized by the frame memory controller. In a preferred implementation, the packet memory transmit data descriptor is provided by packet memory 206 and includes fields indicating to frame memory controller 218 the starting address of the corresponding transmit data buffer in packet memory, and the length of the packet of transmit data in bytes.

Adapter 200 is designed to prevent overruns and underflows during reception and transmission of packets of data. For example, before sending a packet of transmit data from the frame memory controller to MAC 214, a complete packet must be available in transmit data buffers in packet memory 206, and the full packet memory transmit data buffers are identified by packet memory transmit data descriptors. Then, when a packet of transmit data received from the host system is transmitted to network 204 from adapter 200, the adapter does not have to write status information back to the host system.

When a packet of receive data is transferred from network 204 to adapter 200, information contained in fields in the packet memory receive data descriptor received from MAC 214 is forwarded by adapter 200 to the host system in a packet descriptor at the beginning of each packet of receive data that is transferred to the host system. Adapter 200 does not have to generate and forward an additional descriptor, after an entire packet is received from network 204, in order to provide status information to the host system.

In the illustrated embodiment, data is transferred via DMA between the host memory and packet memory 206. Adapter 200 includes a microprocessor 222. However, transmit data stored in host memory is automatically stored in a transmit data queue in packet memory 206 and transmitted by frame memory controller 218 to MAC 214, all without any intervention by microprocessor 222. Similarly, a packet of receive data placed in a receive data queue in packet memory 206 by frame memory controller 218 is automatically stored in host memory without intervention by the microprocessor.

In the data processing system, circular queues of the type described by H. Michael Wenzel for the IEEE P1212 CSR Architecture Specification in "CSR Architecture (DMA Framework): Recommended DMA Architectures," Part III-A, Draft 1.38 (Jul. 5, 1990) are provided for DMA transfers between host memory and the device.

In the illustrated embodiment, the host memory contains a number of receive buffers and transmit buffers. These buffers need not be of fixed size or at any particular location in host memory. The host system provides empty buffers for receive data and full buffers for transmit data. Also, receive descriptors are stored in the host memory in a receive circular queue to indicate where empty receive buffers are stored in host memory. Transmit descriptors are stored in the host memory in a transmit circular queue to indicate where full transmit buffers are stored in host memory.

Preferably, 2048 bytes are provided in host memory for storage of a receive descriptor queue that contains 256 entries, and an additional 2048 bytes are provided in host memory for storage of a transmit descriptor queue that also contains 256 entries. Preferably, each receive data descriptor set up by the host system corresponds to a receive data buffer, and includes fields indicating whether the corresponding buffer is the first buffer allocated for a packet, indicating the starting address of the corresponding receive data buffer in host memory, indicating the length of the corresponding receive data buffer in segments (i.e., 128 byte increments), and indicating the total number of receive data buffers being supplied for receiving a single packet.

Each transmit data descriptor set up by the host system corresponds to a transmit data buffer, and includes fields indicating whether the corresponding buffer is the first buffer allocated for a packet, indicating the starting address of the corresponding transmit data buffer in host memory, indicating the length of the corresponding transmit data buffer in bytes, and indicating whether the corresponding buffer is the last buffer allocated for a packet.

A receive producer index stored in host memory points to a selected receive descriptor in the receive circular queue. A transmit producer index stored in host memory points to a selected transmit descriptor in the transmit circular queue. Preferably, each index identifies one of the corresponding 256 data descriptors that have been set up in a circular queue. Each of these indices is updated by the host system to point to the next location in the circular queue in which a descriptor will be written by the host system.

Packet memory DMA controller gate array 220 includes producer index register 224, consumer index register 226, and a completion index register 228. The host system writes the receive and transmit producer indices into producer index register 224 in response to the updating of these indices. The consumer indices stored in consumer index register 226 point to selected descriptors in the circular queues set up in host memory. Preferably, each consumer index identifies one of 256 data descriptors in a circular queue. The consumer indices preferably point to the last descriptors that were read from the corresponding circular queue in the host memory by adapter 200. The host also writes receive and transmit completion indices into completion register 228 to indicate that the host has completed reading from or writing into a receive or transmit data buffer, respectively.

Adapter 200 includes a receive DMA engine 230 and a transmit DMA engine 232 in packet memory DMA controller gate array 220. As embodied herein, DMA transfer of receive data cannot be commenced by receive DMA engine 230 unless the receive producer index stored in producer index register 224 and the receive consumer index stored in consumer index register 226 do not point to the same receive data descriptor in the circular queue in host memory. DMA transfer of transmit data cannot be commenced by transmit DMA engine 232 unless the transmit consumer index stored in consumer index register 226 does not point to the transmit data descriptor immediately preceding the transmit data descriptor in the circular queue that is pointed to by the transmit producer index stored in producer index register 224. Receive descriptors corresponding to empty receive buffers and transmit descriptors corresponding to full transmit buffers are read from their respective circular queues in first-in, first-out order.

As embodied herein, the receive and transmit DMA engines have a FIFO buffer 234, which provides storage for thirty-four longwords (one longword equals four bytes).

During transfers of receive data, first the host system writes an updated receive producer index into producer index register 224, thereby presenting empty receive data buffers in host memory to accept a complete packet of receive data from network 204. In response, receive DMA engine 230 reads in a receive data descriptor from host memory, selecting from the circular queue in host memory the receive data descriptor (corresponding to an empty receive data buffer) that is identified using the updated producer index. Simultaneously, engine 230 reads a packet memory receive data descriptor previously provided by the frame memory controller.

The packet memory receive data descriptor utilized by receive DMA engine 230 preferably includes fields identifying the starting address of the corresponding receive data buffer in packet memory, the length in bytes of the packet of receive data, frame status bits, a frame status count, and a receive completion code indicating whether the frame was successfully received and providing additional information about reception of the packet. The receive data descriptor in host memory identifies the starting address in host memory of an empty receive data buffer.

Using these two descriptors, the receive DMA engine 230 transfers longwords from packet memory 206 into FIFO buffer 234. As soon as a certain number of longwords are stored in the FIFO buffer, receive DMA engine 230 transfers these longwords from the FIFO buffer into the empty receive data buffer in host memory. Transfers continue in this manner until the amount of data transferred corresponds to the number of bytes in the packet, which is calculated using the information provided in the packet memory receive data descriptor.

Certain information contained in fields in the packet memory receive data descriptor, such as the length of the packet of receive data and a receive completion code indicating whether frames were successfully received and providing additional information about reception of the packet, can be forwarded to the host system in a packet descriptor at the beginning of the packet of receive data. As a result, there is no need for adapter 10 to provide additional status information to the host system, and the adapter does not have to generate and forward an additional descriptor to the host system after the entire packet is transferred into host memory.

During transfers of transmit data, first the host system writes an updated transmit producer index into producer index register 224, thereby providing full transmit data buffers in host memory to present a complete packet of transmit data to be sent to network 204. In response, transmit DMA engine 232 reads in a transmit data descriptor from host memory, selecting from the circular queue in host memory the transmit data descriptor (corresponding to a full transmit data buffer) that is identified using the updated producer index.

The transmit data descriptor utilized by transmit DMA engine 232 includes fields indicating the starting address of a full transmit data buffer in host memory, indicating the length of the corresponding transmit data buffer in bytes, and indicating whether the corresponding buffer is the last buffer allocated for a packet. Using these fields, the transmit DMA engine transfers longwords from the full transmit data buffer in host memory into FIFO buffer 234. As soon as a certain number of longwords are stored in the FIFO buffer, transmit DMA engine 232 transfers these longwords from the FIFO buffer into packet memory 206. Transfers continue in this manner until all of the bytes in the last buffer allocated for a packet have been sent.

The construction of FIFO buffer 234 and control circuitry for controlling its operation during the transfer of data from the host memory to packet memory 206 are the subject matter of the present invention and are described more fully below in connection with FIGS. 3 and 4.

In the illustrated embodiment, receive DMA engine 230 and transmit DMA engine 232 respectively determine whether all of the receive and transmit data in a packet has been transferred. As soon as the correct amount of data has been transferred, the appropriate consumer index is updated by writing into consumer index register 226 an index value corresponding to the data descriptor of the last data buffer in host memory that was written into or read by adapter 200. In addition, a DMA transfer is performed by the DMA engines to write the new consumer index value into host memory.

Further features and aspects of the operation of adapter 200 illustrated in FIG. 2 are more fully described in the above incorporated commonly assigned copending U.S. patent application Ser. No. 07/818,566 now abandoned.

Figure 3:
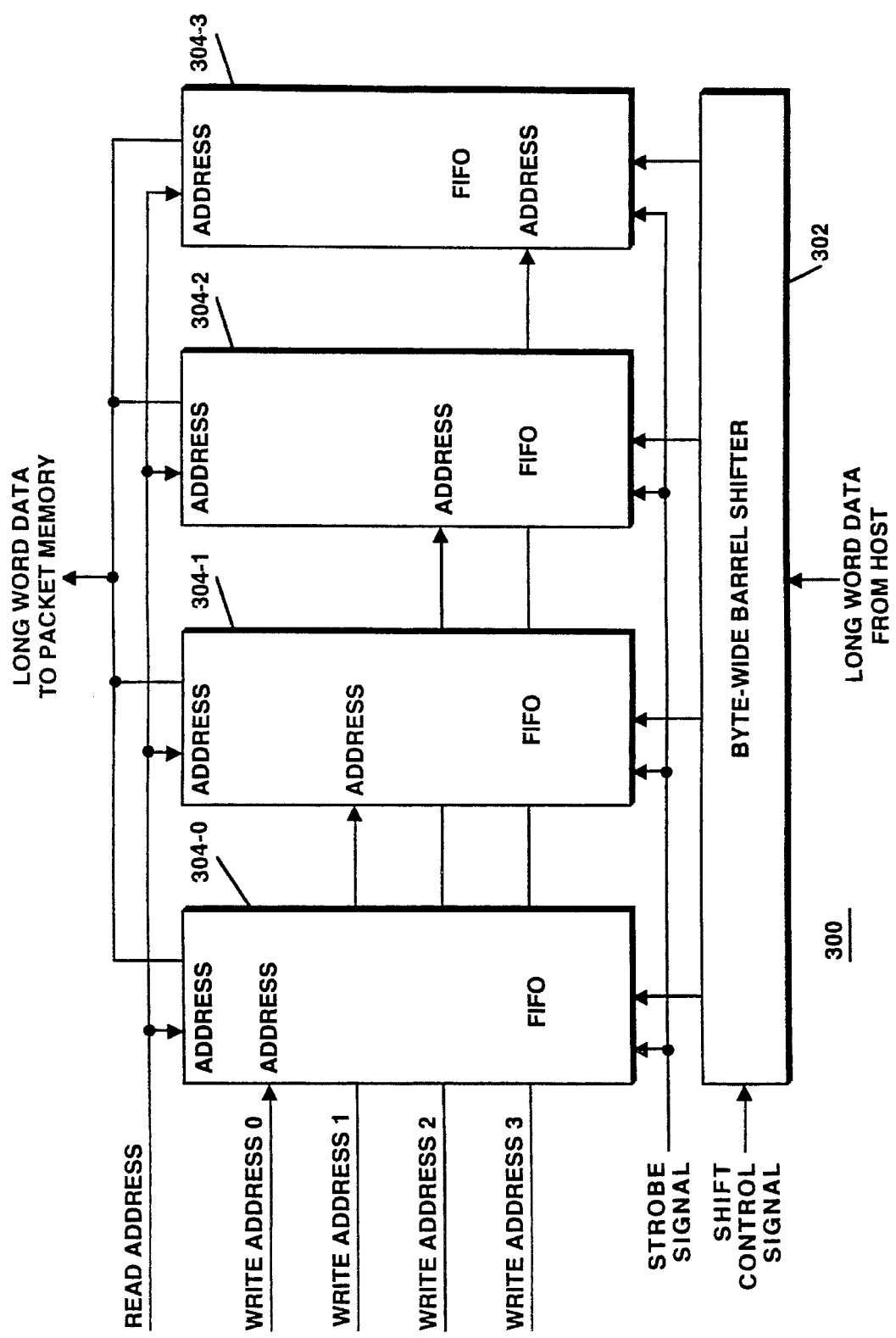
FIG. 3 is a block diagram of a preferred embodiment of a device for practicing the present invention.

FIG. 3 illustrates a data storage circuit 300 corresponding to FIFO buffer 234 illustrated in FIG. 2. The operation of circuit 300 is controlled by control signals generated by a control circuit 400 illustrated in FIG. 4, as well as signals generated by transmit DMA engine 232, as described more fully below. In FIG. 3, circuit 300 includes a barrel shifter circuit 302 which has a byte width equal to the number of bytes in longwords stored in the host memory. In the illustrated embodiment, each longword of data stored in the host memory consists of four bytes. As a result, barrel shifter 302 has a width of four bytes.

Barrel shifter 302 is connected to receive a longword retrieved from the host memory, the retrieved longword preferably being buffered in system bus interface circuitry, not shown, while being received by barrel shifter 302. Barrel shifter 302 has a shifter data output consisting of a number of byte outputs equal in number to the number of bytes in a longword, i.e., four bytes in the illustrated embodiment.

Barrel shifter 302 is also connected to receive a shift control signal, generated by control circuit 400, in response to which shifter 302 provides the bytes of the received longword on its data output with the output bytes barrel shifted relative to the bytes of the received longword in accordance with the shift control signal.

Circuit 300 also includes a first-in-first-out (FIFO) buffer memory circuit 304 containing individual, separately addressable FIFO buffer circuits equal in number to the number of bytes in a longword. Thus, in the illustrated embodiment of the present invention, FIFO circuit 304 contains a series of four individual FIFO circuits 304-0, 304-1, 304-2 and 304-3.

Each of individual FIFO circuits 304-0 to 304-3 is one byte wide. All four FIFO circuits 304-0 to 304-3 have the same byte depth, which in the illustrated embodiment is thirty-four bytes. Data inputs of the individual FIFO circuits are respectively connected to the data outputs of barrel shifter 302. That is, the four separate byte outputs of barrel shifter 302 are respectively connected to individual FIFO circuits 304-0 to 304-3. As a result, the shifted four bytes provided on the data output of shifter 302 are respectively received for storage by FIFO circuits 304-0 to 304-3.

Each of FIFO circuits 304-0 to 304-3 also includes an address input on which to receive write address signals identifying a byte position into which a data byte is to be written, and a strobe input on which to receive an externally generated strobe signal. Receipt of the strobe signal causes the data present on the data input of the individual FIFO circuit to be written at the byte position identified by the write address signal received on the address input. In the illustrated embodiment, the strobe signal is generated by the transmit DMA engine 232.

Since each of FIFO circuits 304-0 to 304-3 have the same depth, they each have the same number of addressable byte positions. As a result, FIFO circuits 304-0 to 304-3 have common, corresponding address locations. For example, the addresses of the first byte position in each of FIFO circuits 304-0 to 304-3 are the same, although the corresponding storage locations are separately addressable for the purpose of writing data. In accordance with the present invention, a FIFO longword address is used to simultaneously identify the corresponding address locations in each of the four individual FIFO circuits. For example, a FIFO longword address identifying the i-th byte position, identifies the same i-th byte position in all four FIFO circuits 304-0 to 304-3.

In accordance with the present invention, identical byte positions in adjacent ones of individual FIFO circuits 304-0 to 304-3 are defined to be contiguous, even though those positions are separately addressable for the purpose of writing data. FIFO circuits 304-0 and 304-3 are respectively the first and last FIFO circuits in the series of individual FIFO circuits. In accordance with the present invention, the i-th byte position in last FIFO circuit 304-3 is defined to be contiguous with the (i+1)th byte position in first FIFO circuit 304-0. The shifted four bytes provided on the data output of shifter 302 are stored in contiguous byte positions in FIFO circuits 304-0 to 304-3. The contiguous byte locations in FIFO circuit 304 are intended for storage of bytes which were originally stored as contiguous bytes in the host memory, so that the contiguity of the bytes is maintained during their temporary storage in FIFO circuit 304.

Each of FIFO circuits 304-0 to 304-3 includes a read address input. The read address inputs are connected in common to enable application of a single longword address identifying a corresponding address location in each of FIFO circuits 304-0 to 304-3. As a result, data can only be read from FIFO circuit 304 in longword format for transfer to packet memory 206 (FIG. 2).

Figure 4:
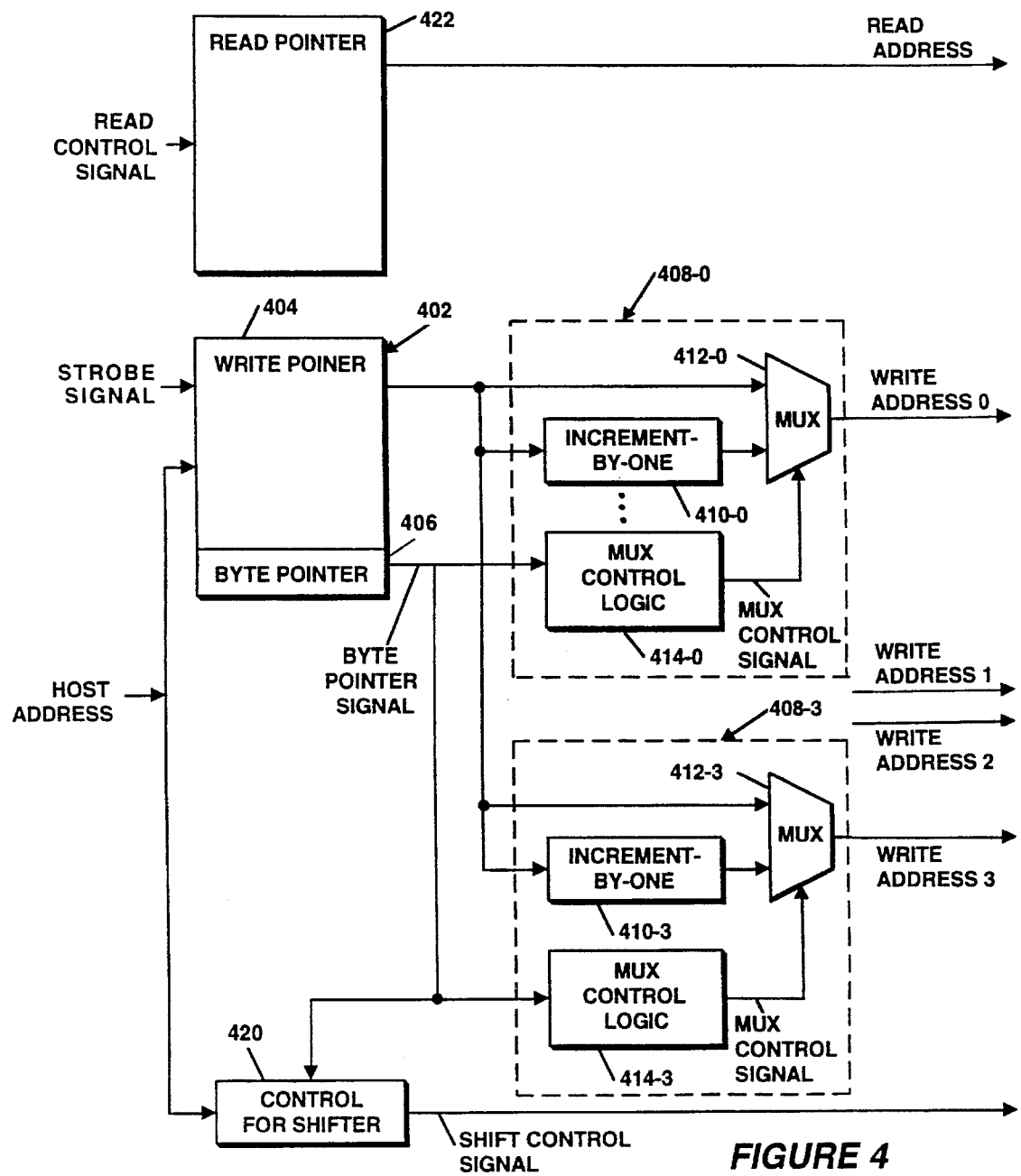
FIG. 4 is a block diagram of a preferred embodiment of a control circuit for use in practicing the present invention.

In reference to FIG. 4, control circuit 400 includes a pointer circuit 402 including a write pointer circuit 404 for generating a current FIFO longword address and a byte pointer circuit 406 for generating a byte pointer signal. Pointer circuit 402 is connected to receive from the host system the address in host memory of the retrieved longword being applied to barrel shifter 302 for storage in FIFO circuit 304, as well as the strobe signal generated by DMA engine 232. Write pointer circuit 404 generates a current longword address for FIFO 304 which contains the next available storage location for writing the first valid byte of a retrieved longword. Write pointer circuit 404 increments the current longword address in response to the strobe signal, the strobe signal causing a write operation into FIFO 304.

Byte pointer circuit 406 reads from the received host memory address data bits indicating the number of valid bytes contained in the received longword and generates a byte pointer signal. The byte pointer signal indicates the number of valid bytes at the storage location in FIFO 304 specified by the current FIFO longword address that store valid bytes.

In the illustrated embodiment, the byte pointer signal also specifically identifies the next available storage location for writing in the current FIFO longword address. In the illustrated embodiment, it is assumed that the bytes in a received longword are identified as byte numbers 0, 1, 2 and 3. The received host memory address includes two validity bits which identify the first valid byte within the received longword. As previously noted, valid bytes are contiguous in host memory. Thus, for example, if the validity bits identify byte no. 1, then bytes nos. 1, 2 and 3 are valid within the received longword.

In the illustrated embodiment, it is also assumed that the byte positions at a given longword position in FIFO 304 that are identified as byte position nos. 0, 1, 2 and 3 respectively correspond to FIFO circuits 304-0 to 304-3. The byte pointer signal is generated by byte pointer circuit 406 has two bits which identify the next available byte position for writing in the longword address position in FIFO 304 specified by the current longword address. For example, if the value of the byte pointer signal is "3", then byte position no. 3 is the next available position for writing a valid byte at the current longword address. Byte pointer circuit 406 updates the value of the byte pointer signal by adding to it the number of valid bytes in each longword successively received from the host memory. This add operation is performed using modulo 4 arithmetic.

Control circuit 400 also includes logic circuits 408-0 to 408-3 respectively associated with FIFO circuits 304-0 to 304-3. Since logic circuits 408-0 to 408-3 have substantially the same configuration, only logic circuit 408-0 is described in detail. Logic circuit 408-0 includes an increment-by-one circuit 410-0 which increments by one the current FIFO longword address generated by write pointer circuit 404. The incremented FIFO longword generated by circuit 410-0 identifies in FIFO circuit 304-0 the next longword position following the longword position identified by the current FIFO longword address generated by pointer circuit 404.

Circuit 408-0 also includes a multiplexer circuit (MUX) 412-0, which is connected to receive the current FIFO longword address generated by write pointer circuit 404 and the incremented FIFO longword address generated by circuit 410-0. MUX 412-0 provides on its output one of the longword addresses applied thereto in accordance with a MUX control signal. The MUX control signal is generated by a MUX control logic circuit 414-0 which is connected to receive the byte pointer signal. Logic circuit 414-0 determines whether the next available storage location in FIFO circuit 304-0 is contained at the current FIFO longword address or at the incremented FIFO longword address. In accordance with the result of this determination, logic circuit 414-0 generates the MUX control signal to cause MUX 412-0 to select the FIFO longword address containing the next available storage location in FIFO circuit 304-0.

Since the conditions for generating the MUX control signal differ slightly for each of FIFO circuits 304-0 to 304-3, each of logic circuits 414-0 to 414-3 contains slightly different logic for generating the MUX control signal.

The following pseudocode expressions (1) to (4) respectively represent the logical functions performed by MUX logic circuits 414-0 to 414-3. In expressions (1) to (4), it is assumed that, as noted above, the byte pointer signal can only have a value of 0, 1, 2 or 3. The arithmetic implemented in expressions (1) to (4) is modulo n where n is the longword depth of FIFO circuit 304.

```
IF Byte_Pointer Greater Than 0 THEN
    Write_Address0 = Write_Address + 1      (1)
ELSE
```

```
        Write_Address0 = Write_Address;
IF Byte_Pointer Greater Than 1 THEN
        Write_Address1 = Write_Address + 1      (2)
ESLE
        Write_Address1 = Write_Address;
IF Byte_Pointer Greater Than 2 THEN
        Write_Address2 = Write_Address + 1      (3)
ELSE
        Write_Address2 = Write_Address;
IF Byte_Pointer Greater Than 3 THEN
        Write_Address3 = Write_Address + 1      (4)
ELSE
        Write_Address3 = Write_Address.
```

In expressions (1) to (4), the term Write_Address is defined as the current longword address generated by write pointer circuit 404. The terms Write_Address0, Write_Address1, Write_Address2, and Write_Address3 are respectively the FIFO write addresses outputted by MUXs 412-0 to 412-3 in accordance with the determination made by logic circuits 414-0 to 414-3. It is noted that the result of the logical determination in expression (4) always results in Write_Address3 being set equal to the current longword address.

Control circuit 400 also includes a shift control circuit 420 which is connected to receive the host memory address as well as the byte pointer signal. As noted above, the host memory address contains the two validity bits identifying the first one of the contiguous valid bytes in the received longword. Using this information and the byte pointer signal, shift control circuit 420 generates the shift control signal to control barrel shifter 302 to shift the received longword such that the first valid byte of the received longword is aligned with the first available storage location at the current longword address in FIFO 304.

Shift control circuit 420 performs a subtraction operation to determine the required amount of shift the bytes of the received longword, as described above. Shift control circuit 420 subtracts the value of the byte pointer signal generated by byte pointer circuit 406, which points to the next available byte position in FIFO 304 at the current FIFO longword address, from the value of the validity bits contained in the received host address. The shift amount computed by the subtraction operation is the number of bytes by which barrel shifter rotates to the left (as viewed in FIG. 3). The subtraction is performed using modulo 4 arithmetic.

As shown in FIG. 4, control circuit 400 also includes a read pointer circuit 422 which is connected to receive a read control signal from transmit DMA engine 232 (FIG. 2). In response to the read control signal, circuit 422 generates a longword address that is applied as a common read address to the read address inputs of FIFO circuits 304-0 to 304-3. Data can then be read from FIFO 304 in longword format from the read address generated by read pointer circuit 422.

The operation of memory circuit 300 is described next by providing an example of its operation for a particular set of conditions. In the example, valid bytes are already stored in FIFO circuits 304-0 and 304-1 at the current longword address, so that the first available storage location at the current longword address is in FIFO circuit 304-2. Therefore, under these conditions, byte pointer circuit 406 generates a byte pointer signal having a value "2", i.e., pointing to the byte storage location in FIFO circuit 304-2. In the example, it is assumed the longword retrieved from host memory contains three valid bytes as byte nos. 1, 2 and 3. Therefore the value of the host address validity pointer is "1". For illustrative purposes, the retrieved longword is represented as follows:

X B1 B2 B3 where bytes B1, B2, and B3 are valid bytes and byte X is an invalid byte.

In the operation of memory circuit 300, the four bytes of the longword retrieved from the host memory are applied to barrel shifter 302. Shift control circuit 420 generates the shift control signal to cause barrel shifter 302 to provide on its outputs the four bytes of the received longword barrel shifted such that the first valid byte of the longword is aligned with the one of FIFO circuits 304-0 to 304-3 having the first available storage location at the current FIFO longword address generated by FIFO address generator 404. Thus, in the present example, shift control circuit 420 performs above described subtraction. In the subtraction operation, the value of the host validity bits is "1" and the value of the byte pointer signal is "2". Therefore, shift control circuit 420 computes a shift amount equal to "3", using modulo 4 arithmetic. Shift control circuit 420 therefore generates a shift control signal to cause barrel shifter 302 to barrel shift the bytes of the received longword by three byte positions to the left so that byte nos. 3, 0, 1 and 2 of the received longword are respectively aligned for writing into FIFO circuits 304-0 to 304-3. Therefore, the bytes of the retrieved longword as provided on the output of barrel shifter 302 are arranged as follows:

B3 X B1 B2.

Write pointer circuit 404 generates the current FIFO longword address. Each increment-by-one circuit 410-0 to 410-3 generates the current FIFO longword address incremented by one so that each MUX 412-0 to 412-3 receives the two generated addresses, as previously described. In accordance with expressions (1) and (2), since the value of the byte pointer is "2", MUX control logic circuits 414-0 and 414-1 respectively generate MUX control signals causing associated MUXs 412-0 and 412-1 to provide the incremented longword address. In accordance with expressions (3) and (4), MUX control circuits 414-2 and 414-3 respectively generate MUX control signals causing associated MUXs 412-2 and 412-3 to provide the longword address as generated by write pointer circuit 404.

With address signals and data applied to FIFO circuits 304-0 to 304-3, the strobe signal is applied causing valid byte nos. 1 and 2 of the retrieved longword to be stored at the current longword address in FIFO circuits 304-2 and 304-3 and valid byte no. 3 and invalid byte no. 0 of the retrieved longword to be respectively stored at the incremented FIFO longword address in FIFO circuits 304-0 and 304-1.

In the next write operation, the invalid byte no. 0 stored in FIFO circuit 304-1 at the longword position one greater than the current longword address, will be overwritten. This is because byte pointer circuit 406 updates the value of the byte pointer signal by adding to it the number of valid bytes contained in each longword received from the host memory, using modulo 4 arithmetic. As a result, the updated value of the byte pointer will identify the byte storage location in FIFO 304-1 as being the next available storage location for writing.

It is a preferred practice herein to transfer data in blocks from the host memory to packet memory 206 for transmission on network 204. Each such block is described by a corresponding transmit data descriptor. As previously described, the transmit data descriptor includes the starting address of a full transmit data buffer in host memory and the length of the corresponding transmit buffer in bytes. While, as noted above, valid bytes are contiguous in a longword stored in host memory, it is a further preferred practice herein that, with the exception of the first and last longword in the block of data to be transferred, the entire data block in host memory is required to consist only of contiguous valid longwords each containing four valid bytes. Since data storage circuit 300 and its control circuit 400 require for proper operation the host address of each successive longword received for storage, the data processing system includes, e.g., in the system bus interface logic or in DMA transmit engine 232, host address update circuitry for incrementing the starting host address upon retrieval of each successive longword in the block of data. Further, since it is required that all bytes within the block be valid, the host validity pointer is set equal to byte no. 0 in each incremented host address. Each successive address provided by the host address update circuitry is provided to control circuit 400.

With respect to the last longword in the block, given the total number of valid bytes in the block (contained in the transmit data descriptor) and the number of valid bytes in the first longword (contained in the host address validity pointer of the start address of the block), the number of valid bytes in the last longword can readily be computed. In accordance with a known practice in the art, a countdown of the number of valid bytes being transferred during the block transfer is maintained in the bus interface logic. Thus, the countdown decrements for each transferred longword. As a result, in the above described embodiment of the invention, when the countdown is decremented to a value of four or less, this corresponds to the situation in which the next longword to be transferred is the last longword in the block. This final value of the countdown corresponding to the last longword indicates the number of valid bytes in the last longword. In the illustrated embodiment of the invention, the final countdown value is used to determine the amount by which the value of the byte pointer signal is to be incremented. Subsequently, when a next block of data is transferred, the value of the byte pointer signal will correctly cause the first valid byte in the next block to overwrite in FIFO 304 the first invalid byte in the last longword of the previous block.

While the data storage circuit of the present invention has been described for use in a communication adapter in which data transfers are controlled by DMA, the invention is not so limited. The benefits of the invention can be fully realized without regard to the particular scheme utilized for controlling the data transfer.

The data storage circuit of the present invention, such as embodied in data storage circuit 300 and control circuit 400, is preferably implemented in an integrated circuit. However, the circuit can be constructed with discrete components.

In accordance with the invention, the term "byte" is intended to mean a unit of data consisting of a predetermined number of bits which is not necessarily equal to the industry standard eight bits. For example, a byte as used herein could consist of nine bits which include one parity bit.

While an illustrated embodiment of the invention has been described as including a FIFO containing four individual FIFO circuits to store four-byte longwords, the invention is not so limited. In accordance with the invention the FIFO contains a number of individual FIFO circuits equal in number to the number of bytes in a longword. The modulo of the arithmetic operations described above would change in correspondence with the size of the longword.

While the data storage circuit of the present invention has been illustrated and described for facilitating the transfer of data between a host system and a communication network, those skilled in the art will now recognize that the invention has broader applicability to situations in which data is being transferred from memory to a peripheral device, e.g., a disk storage system.

It will be apparent to those skilled in the art that various modifications and variations can be made in the present invention without departing from the scope or spirit of the invention. For example, various implementations of hardware and/or software can be used to transfer data via and communication can be performed over different types of system buses and networks. Thus, it is intended that the present invention cover the modifications and variations or this invention provided they come within the scope of the appended claims and their equivalents.

What is claimed is:

1. A data storage circuit in a data processing system, wherein the data processing system includes a host system having a system bus coupled to a host memory, a communication network, and a communication adapter coupled between the system bus and the communication network for transferring valid bytes of data from the host memory for transmission on the network, said valid bytes of data included as contiguous bytes in longwords stored in the host memory, the longwords in host memory each consisting of N bytes that are retrieved in longword format, N being a predetermined integer greater than or equal to one, said data storage circuit included in the communication adapter, said data storage circuit comprising:

a barrel shifter, coupled to receive a data longword retrieved from the host memory and responsive to a shift control signal, to shift the position of the N bytes of the received longword in accordance with the shift control signal;

N FIFO memory circuits, coupled to receive the N shifted bytes provided by said barrel shifter, and an address signal including N address signals, for storing the N shifted bytes in a sequence of N contiguous available memory locations respectively identified by said N address signals, the sequence of contiguous available locations commencing with a first available byte location in which a next valid byte is to be stored, each of said FIFO memory circuits having a write address port fed by separate address lines thus being separately addressable, said FIFO memory circuits being respectively coupled to receive the N bytes of the shifted longword provided by said barrel shifter; and control means, operatively coupled to receive information from the host system describing the location of valid bytes in the longword retrieved from host memory, for generating said shift control signal to control the barrel shifter to provide the shifted longword such that the first valid byte of the retrieved longword is aligned with a first available byte location in said FIFO memory circuits , and for generating said address signal.

2. The data storage circuit of claim 1 wherein said FIFO memory circuits store the N shifted bytes substantially simultaneously.

3. The data storage circuit of claim 2 wherein each of said FIFO memory circuits are one byte wide and M bytes deep, M being a predetermined integer greater than one.

4. The data storage circuit of claim 3 wherein each byte in each of said FIFO memory circuits is contiguous with two bytes in two separate ones of said FIFO memory circuits and wherein the byte identified by an address in a last one of the FIFO memory circuits is contiguous with the byte identified by an address with an incremented value in a first one of the FIFO memory circuits.

5. The data storage circuit of claim 4 wherein a longword address identifies a corresponding one of the M bytes in each of said FIFO memory circuits;

said control means including:

write address generating means for generating a current longword address corresponding to the first available byte location in said FIFO memory circuits;

byte signal generating means for generating a byte signal representative of the number of said FIFO memory circuits already storing a valid byte at the current longword address; and logic means, coupled to receive the byte signal and the current longword address, for generating an address signal for each of said FIFO memory circuits, the address signal corresponding to one of the byte identified by the current longword address and the byte identified by an incremented longword address.

6. The data storage circuit of claim 5, said logic means including a logic circuit associated with each of said FIFO memory circuits, each said logic circuit including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address in accordance with said multiplexer control signal; and multiplexer logic means, coupled to receive said byte signal, for generating said multiplexer control signal.

7. The data storage circuit of claim 5, wherein the host address of the retrieved longword includes a validity pointer which identifies the first valid byte in the retrieved longword, and wherein the byte signal identifies one Of said FIFO memory circuits having the first available byte storage location at the current longword address; and said control means including means, coupled to receive said byte signal and said validity pointer, for generating said shift control signal.

8. The data storage circuit of claim 7, said logic means including a logic circuit associated with each of said FIFO memory circuits, each said logic circuit including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address in accordance with said multiplexer control signal; and multiplexer logic means, coupled to receive said byte signal, for generating said multiplexer control signal.

9. The data storage circuit of claim 5, said logic means including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address for each of said FIFO memory circuits in accordance with said multiplexer control signal; and multiplexer logic means, coupled to receive said byte signal, for generating said multiplexer control signal.

10. In a data processing system including a host system having a system bus coupled to a host memory, a communication network, and a communication adapter coupled between the system bus and the network for transferring valid bytes of data from the host memory for transmission on the network, said valid bytes of data included as contiguous bytes in longwords stored in the host memory, the longwords in host memory each consisting of N bytes that are retrieved in longword format, N being a predetermined integer greater than or equal to one, a method for storing data in a buffer memory in the communication adapter, wherein the buffer memory has a first available byte storage location in which the next byte is to be stored, said method comprising the steps of:

receiving a data longword retrieved from the host memory;

generating a shift control signal to realign the position of the N bytes in the received longword;

shifting the position of the N bytes of the received longword with a barrel shifter in accordance with the shift control signal to align the first valid byte of the retrieved longword with the first available byte location in the buffer memory and to provide a shifted longword;

providing a write address indicating a longword location in the buffer memory that contains the first available byte location;

storing, in the buffer memory, substantially simultaneously the N bytes of the shifted longword in a sequence of contiguous available memory locations starting at the first available byte location wherein the buffer memory comprises N FIFO circuits, each being one byte wide and consisting of M bytes, M being a predetermined integer greater than one, each of said N FIFO circuits being separately addressable for writing, wherein a longword address identifies a corresponding one of the M bytes in each FIFO circuit;

wherein each byte in each of said N FIFO circuits is contiguous with two bytes in two separate FIFO circuits and wherein the byte identified by a longword address in a last one of the FIFO circuits is contiguous with the byte identified by a longword with an incremented value in a first one of the FIFO circuits;

wherein the step of generating a write address comprises generating a current longword address;

said method comprising the further step of: generating a byte signal representative of the number of FIFO circuits already storing a valid byte at the current longword address; and the step of generating a current longword address comprises generating the current longword address corresponding to the first available byte location in said N FIFO circuits; and generating, in accordance with said byte signal, an address signal corresponding to one of the bytes identified by the current longword address and the byte identified by an incremented longword address.

11. The method of claim 10, wherein the substep of generating each of said N address signals includes the further substeps of:

generating an incremented address corresponding to the current longword address incremented by one;

generating an address selection control signal in accordance with said byte signal; and providing to each of said N FIFO circuits one of the current longword address and the incremented address, in accordance with said address selection signal.

12. The method of claim 10, wherein the host address of the retrieved longword includes a validity pointer which identifies the first valid byte in the retrieved longword, and wherein the byte signal identifies the FIFO memory circuit having the first available byte storage location at the current longword address;

the step of generating the shift control signal comprises generating said shift control signal in accordance with said byte signal and said validity pointer.

13. The method of claim 12, wherein the step of generating a write address comprises:

generating an incremented address corresponding to the current longword address incremented by one;

generating an address selection control signal in accordance with said byte signal; and providing to each of said N FIFO circuits one of the current longword address and the incremented address, in accordance with said address selection signal.

14. A data processing system, comprising:

a host system including a host memory and a system bus coupled to the host memory;

communication adapter means, connected to the system bus and connectable to a communication network, for transferring valid bytes of data from the host memory for transmission on the external communication network, said valid bytes of data included in data longwords stored in the host memory, the longwords in host memory each consisting of N bytes that are retrievable in longword format, N being a predetermined integer greater than or equal to one, said communication adapter means including:

a data storage circuit including:

a barrel shifter, coupled to receive a data longword retrieved from the host memory and responsive to a shift control signal, to shift the position of the N bytes of the received longword in accordance with the shift control signal;

N FIFO memory circuits, coupled to receive the N shifted bytes provided by said barrel shifter, and an address signal, including N address signals for storing the N shifted bytes in a sequence of N contiguous available memory locations respectively identified by said N address signals, the sequence of contiguous available locations commencing with a first available byte location in which a next valid byte is to be stored, each of said FIFO circuits having a write address port fed by separate address lines to be separately addressable, said FIFO memory circuits being respectively coupled to receive the N bytes of the shifted longword provided by said barrel shifter;

control means, operatively coupled to receive information from the host system describing the location of valid bytes in the longword retrieved from host memory, for generating said shift control signal to control the barrel shifter to provide the shifted longword such that the first valid byte of the retrieved longword is aligned with the first available byte location in said FIFO memory circuits in which a next valid byte is to be stored, and for generating said address signal, so that only valid bytes are stored in said FIFO memory circuits, and said FIFO memory circuits being addressable to read therefrom the stored valid bytes as valid longwords each consisting of only valid bytes;

packet memory means, coupled to said FIFO memory circuits, for storing successive longwords read from said FIFO memory circuits; and means for transferring to the network the valid longwords stored in said packet memory for transmission on the network.

15. The data processing system of claim 14 wherein said FIFO memory circuits store the N shifted bytes substantially simultaneously.

16. The data processing system of claim 14 wherein said valid bytes of data are included as contiguous bytes in the data longwords stored in the host memory; and wherein said buffer memory means stores the N shifted bytes substantially simultaneously.

17. The data processing system of claim 16 wherein each of said FIFO memory circuits are one byte wide and consist of M bytes, M being a predetermined integer greater than one.

18. The data processing system of claim 17 wherein each byte in each of said FIFO memory circuits is contiguous with two bytes in two separate ones of said FIFO memory circuits and wherein the byte identified by an address in a last one of the FIFO memory circuits is contiguous with the byte identified by an address with an incremented value in a first one of the FIFO memory circuits.

19. The data processing system of claim 18 wherein a longword address identifies a corresponding one of the M bytes in each of said FIFO memory circuits;

said control means including:

write address generating means for generating a current longword address corresponding to the first available byte location in said buffer memory means;

byte signal generating means for generating a byte signal representative of the number of said FIFO memory circuits already storing a valid byte at the current longword address; and logic means, coupled to receive the byte signal and the current longword address, for generating an address signal for each of said FIFO memory circuits, the address signal corresponding to one of the byte identified by the current longword address and the byte identified by an incremented longword address.

20. The data processing system of claim 19, said logic means including a logic circuit associated with each of said FIFO memory circuits, each said logic circuit including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address in accordance with aid multiplexer control signal; and multiplexer logic means, coupled to receive said byte signal, for generating said multiplexer control signal.

21. The data processing system of claim 19, wherein the host address of the retrieved longword includes a validity pointer which identifies the first valid byte in the retrieved longword, and wherein the byte signal identifies the FIFO memory circuit having the first available byte storage location at the current longword address; and said control means including means, coupled to receive said byte signal and said validity pointer, for generating said shift control signal.

22. The data processing system of claim 21, said logic means including a logic circuit associated with each of said N FIFO circuits, each said logic circuit including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address in accordance with said multiplexer control signal; and multiplexer logic means, coupled to receive said byte signal, for generating said multiplexer control signal.

23. The data processing system of claim 19, said logic means including:

incrementing means, coupled to receive the current longword address, for generating an incremented address corresponding to the current longword address incremented by one;

multiplexing means, coupled to receive the current longword address, the incremented address and a multiplexer control signal, for providing one of the current longword address and the incremented address for each of said N FIFO circuits in accordance with said multiplexer control signal; and multiplexer logic means, coupled to receive said byte signal, for generating said multiplexer control signal.

* * * * *